United States Patent
Lotem et al.

(10) Patent No.: US 9,946,496 B2
(45) Date of Patent: Apr. 17, 2018

(54) SSD WITH NON-BLOCKING FLUSH COMMAND

(71) Applicant: Elastifile Ltd., Herzliya (IL)

(72) Inventors: Eyal Lotem, Pardes Hanna (IL); Avraham Meir, Rishon LeZion (IL); Shahar Frank, Ramat Hasharon (IL)

(73) Assignee: Elastifile Ltd., Herzliya (IL)

( * ) Notice: Subject to any disclaimer, the term of this patent is extended or adjusted under 35 U.S.C. 154(b) by 284 days.

(21) Appl. No.: 15/075,157

(22) Filed: Mar. 20, 2016

(65) Prior Publication Data

US 2017/0031604 A1 Feb. 2, 2017

Related U.S. Application Data

(60) Provisional application No. 62/197,131, filed on Jul. 27, 2015.

(51) Int. Cl.
*G06F 3/06* (2006.01)
*G06F 12/08* (2016.01)

(52) U.S. Cl.
CPC .......... *G06F 3/0688* (2013.01); *G06F 3/0619* (2013.01); *G06F 3/0656* (2013.01); *G06F 12/08* (2013.01)

(58) Field of Classification Search
CPC .... G06F 3/0688; G06F 3/0619; G06F 3/0656; G06F 12/08
USPC ............. 711/103, 154, 156; 365/185.33
See application file for complete search history.

(56) References Cited

U.S. PATENT DOCUMENTS

| | | | | |
|---|---|---|---|---|
| 6,546,459 B2 * | 4/2003 | Rust | .................. | G06F 3/0619 710/39 |
| 7,613,743 B1 * | 11/2009 | Giampaolo | ......... | G06F 11/1474 |
| 7,899,800 B2 * | 3/2011 | Fachan | ............... | G06F 12/0804 707/704 |
| 8,024,507 B2 * | 9/2011 | Patel | .................. | G06F 11/1435 711/102 |
| 8,527,693 B2 * | 9/2013 | Flynn | ................. | G06F 11/1008 711/103 |
| 8,949,509 B2 * | 2/2015 | Schuette | ................ | G06F 3/061 711/103 |
| 9,003,103 B2 * | 4/2015 | Paleologu | ........... | G06F 11/1076 711/103 |
| 9,208,071 B2 * | 12/2015 | Talagala | ............. | G06F 12/0246 |
| 9,558,229 B2 * | 1/2017 | Lee | .................. | G06F 17/30368 |
| 9,645,939 B2 * | 5/2017 | Dulloor | .............. | G06F 12/0891 |
| 9,697,219 B1 * | 7/2017 | Wang | ................ | G06F 17/30144 |
| 9,767,017 B2 * | 9/2017 | Talagala | ............. | G06F 12/0246 |
| 9,772,938 B2 * | 9/2017 | Talagala | ............. | G06F 12/0246 |

(Continued)

*Primary Examiner* — Stephen Elmore
(74) *Attorney, Agent, or Firm* — D. Kligler IP Services Ltd.

(57) ABSTRACT

A computing system includes a storage device and a host. The storage device includes a volatile memory and a non-volatile memory, and is configured to receive data for storage in the non-volatile memory, to buffer at least some of the received data temporarily in the volatile memory, and to guarantee that any data, which is not part of a predefined amount of data that was most recently received, has been committed to the non-volatile memory. The host is configured to send the data for storage in the storage device, and, in response to a need to commit given data to the non-volatile memory, to send the given data to the storage device followed by at least the predefined amount of additional data.

14 Claims, 1 Drawing Sheet

(56) References Cited

U.S. PATENT DOCUMENTS

| | | |
|---|---|---|
| 2011/0252201 A1 | 10/2011 | Koren et al. |
| 2014/0059271 A1* | 2/2014 | Meir .................. G06F 3/061 |
| | | 711/103 |
| 2015/0106410 A1 | 4/2015 | Zaltsman et al. |
| 2015/0220439 A1 | 8/2015 | Mickens et al. |
| 2016/0203219 A1 | 7/2016 | Hoch et al. |

* cited by examiner

SSD WITH NON-BLOCKING FLUSH COMMAND

CROSS-REFERENCE TO RELATED APPLICATIONS

This application claims the benefit of U.S. Provisional Patent Application 62/197,131, filed Jul. 27, 2015, whose disclosure is incorporated herein by reference.

FIELD OF THE INVENTION

The present invention relates generally to data storage, and particularly to methods and systems for non-blocking flushing of data to non-volatile memory.

BACKGROUND OF THE INVENTION

Some storage devices support flush commands, which instruct the storage device to transfer the data immediately from volatile memory to non-volatile storage. Various types of flush operations are known in the art. For example, U.S. Patent Application publication 2011/0252201, whose disclosure is incorporated herein by reference, describes smart flushing of data to backup storage.

U.S. Patent Application publication 2015/0106410, whose disclosure is incorporated herein by reference, describes a Solid State Drive (SSD) comprising Flash devices and a volatile memory. In an embodiment, a host sends to the SSD a command to flush a certain file or part of a file, or data relating to a particular storage command (e.g., thread or tag) from the volatile memory to the Flash devices.

U.S. Patent Application publication 2015/0220439, whose disclosure is incorporated herein by reference, describes block storage schemes that decouple ordering from durability. One example scheme buffers write commands and causes the write commands to be committed to storage in flush epoch order. Another example scheme maintains a persistent log of write commands that are arranged in the persistent log in flush epoch order. Both examples provide a prefix consistent state in the event of a crash.

SUMMARY OF THE INVENTION

An embodiment of the present invention that is described herein provides a computing system including a storage device and a host. The storage device includes a volatile memory and a non-volatile memory, and is configured to receive data for storage in the non-volatile memory, to buffer at least some of the received data temporarily in the volatile memory, and to guarantee that any data, which is not part of a predefined amount of data that was most recently received, has been committed to the non-volatile memory. The host is configured to send the data for storage in the storage device, and, in response to a need to commit given data to the non-volatile memory, to send the given data to the storage device followed by at least the predefined amount of additional data.

Typically, the host is configured to send the given data without an explicit command that instructs the storage device to transfer the given data to the non-volatile memory. In an embodiment, the storage device is configured to notify the host of a size of the predefined amount of data.

In some embodiments, a storage space in the storage device, or the data to be stored in the storage device, is divided into two or more portions, and the storage device is configured to guarantee committing of the data independently for each of the two or more portions. In an embodiment, the host is configured to commit a data item associated with the first portion, by sending the data item to the storage device followed by at least the predefined amount of additional data associated with the first portion. Additionally or alternatively, the first and second portions correspond to first and second respective subsets of non-volatile memory devices in the storage device, or with first and second respective streams defined in the storage device.

There is additionally provided, in accordance with an embodiment of the present invention, a method for data storage. The method includes, in a storage device that includes a volatile memory and a non-volatile memory, receiving data for storage in the non-volatile memory, buffering at least some of the received data temporarily in the volatile memory, and guaranteeing that any data, which is not part of a predefined amount of data that was most recently received, has been committed to the non-volatile memory. The data is sent from a host for storage in the storage device. In response to a need to commit given data to the non-volatile memory, the given data is sent from the host to the storage device followed by at least the predefined amount of additional data.

There is further provided, in accordance with an embodiment of the present invention, a storage device including a volatile memory, a non-volatile memory and a controller. The controller is configured to receive data for storage in the non-volatile memory, to buffer at least some of the received data temporarily in the volatile memory, to receive a flush command that instructs the storage device to commit the buffered data to the non-volatile memory, and, after receiving the flush command and before the buffered data has been completely committed in response to the flush command, to receive and execute one or more read commands that request readout of some of the data.

There is also provided, in accordance with an embodiment of the present invention, a method for data storage. The method includes, in a storage device that includes a volatile memory and a non-volatile memory, receiving data for storage in the non-volatile memory, and buffering at least some of the received data temporarily in the volatile memory. A flush command, which instructs the storage device to commit the buffered data to the non-volatile memory, is received in the storage device. After receiving the flush command and before the buffered data has been completely committed in response to the flush command, one or more read commands that request readout of some of the data are received and executed in the storage device.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for flushing data from volatile memory to non-volatile memory in a storage device. In the disclosed embodiments, a host sends data for storage in a storage device that comprises both a volatile memory and a non-volatile memory. The storage device buffers at least some of the received data temporarily in the volatile memory, before transferring the data to the non-volatile memory for persistent storage.

In some embodiments, at some point in time the host encounters a need to commit given data to the non-volatile memory. In other words, the host needs to ensure that given data has been transferred successfully to the non-volatile memory and, for example, will not be lost if electrical power is interrupted. The host thus issues to the storage device a "flush" command, which instructs the storage device to transfer all the buffered data immediately from the volatile memory to the non-volatile memory.

In the embodiments described herein, the flush operations performed by the storage device are non-blocking, i.e., enable the host to continue issuing and executing storage commands in the storage device while flushing is still in progress.

In some embodiments, the host and the storage device support a "virtual flush" operation—A flush operation that does not involve an explicit flush command or acknowledgement. In these embodiments, the storage device guarantees that only a predefined amount of most-recently received data may be non-committed. In other words, the storage device guarantees that any data received before this predefined amount of most-recently received data, has already been committed to the non-volatile memory. In these embodiments, when the host needs to commit given data to the non-volatile memory, it does not need to issue a flush command, but merely to ensure that sufficient subsequent data (at least the predefined amount) is sent to the storage device. The "virtual flush" operation is non-blocking and does not disrupt the normal flow of data between the host and the storage device.

In other embodiments, the storage device supports a flush command that is blocking for write commands but non-blocking for read commands. Thus, in the period of time after the flush command is issued until all the buffered data is committed to the non-volatile memory, the storage device is able to receive and execute read commands. From the host's perspective, this capability means that the host is able to issue and execute read commands after issuing the flush command and before the flush command is acknowledged by the storage device.

Several example implementations of the disclosed techniques are described herein. For example, any of the disclosed techniques can be implemented globally over the entire storage device, or separately for different parts of the storage device, e.g., per stream, locality, thread or channel.

System Description

Figure 1:
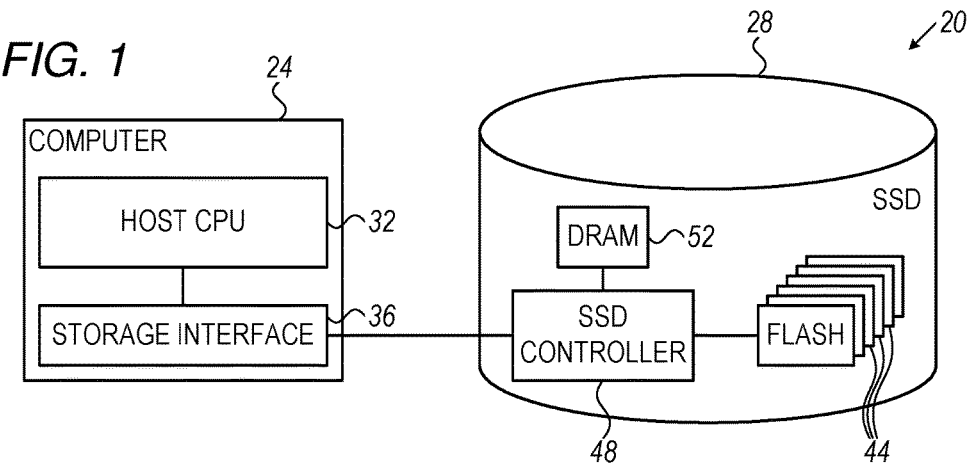
FIG. 1 is a block diagram that schematically illustrates a computing system, in accordance with an embodiment of the present invention.

FIG. 1 is a block diagram that schematically illustrates a computing system 20, in accordance with an embodiment of the present invention. System 20 comprises a host, in the present example a computer 24, which stores data in a storage device, in the present example a Solid State Drive (SSD) 28. Computer 24 may comprise, for example, a server, a personal computer or any other suitable computing platform. Computer 24 and SSD 28 may be connected directly or over a suitable communication network.

In the embodiment of FIG. 1, computer 24 comprises a Central Processing Unit (CPU) 32, also referred to as a processor, and a storage interface 36 that is configured to communicate with SSD 28. CPU 32 runs various software programs, e.g., an Operating System (OS) and user applications.

SSD 28 comprises a non-volatile memory, in the present example multiple Flash memory devices 44. An SSD controller 48 communicates with computer 24 and manages the storage of data in Flash devices 44. In addition, SSD 28 comprises a volatile memory, in the present example a Dynamic Random Access Memory (DRAM) 52. SSD controller 48 uses DRAM 52, for example, for temporarily storing data that is received for storage, before transferring the data for persistent storage in Flash devices 44. DRAM 52 can also be used for storing management information, metadata or any other suitable information.

The configurations of system 20, computer 24 and SSD 28 shown in FIG. 1 are example configurations, which are chosen purely for the sake of conceptual clarity. In alternative embodiments, the disclosed techniques can be implemented with any other suitable system, host and/or storage device configuration.

For example, in some embodiments the data is stored in SSD 28 by a distributed, network-based file system (FS). An example of such a FS is described in U.S. patent application Ser. No. 14/595,236, filed Jan. 13, 2015, entitled "Distributed file system for virtualized computing clusters," whose disclosure is incorporated herein by reference.

The different elements of system 20, computer 24 and SSD 28 may be implemented using suitable hardware, using software, or using a combination of hardware and software elements. In some embodiments, host CPU 32 and/or SSD controller 48 comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Non-Blocking "Virtual Flush" Operation

In some embodiments, computer 24 and SSD 28 support a "virtual flush" operation. This operation is virtual in the sense that no actual explicit flush command is sent from computer 24 to SSD 28. Instead, the "virtual flush" operation is based on a guarantee by the SSD, that at any point in time, only a predefined amount of most-recently received data may be non-committed.

In these embodiments, a predefined amount of X KB of data is agreed upon between SSD 28 and computer 24. The SSD guarantees that any data, other than the most-recently received X KB, is already committed to Flash devices 44. With this guarantee, when the host needs to commit given data to non-volatile memory, all it needs to ensure is that sufficient subsequent data (at least X KB) is sent to SSD 28.

Figure 2:
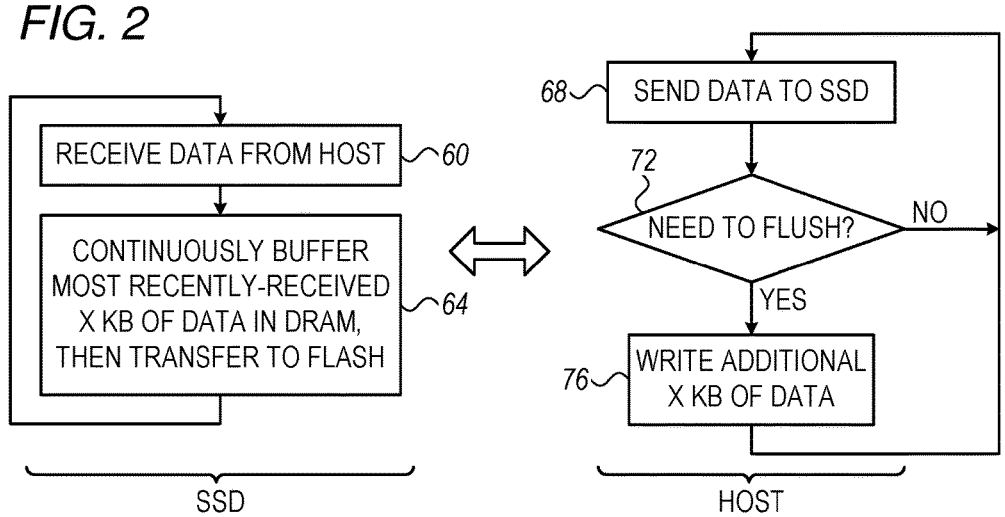
FIG. 2 is a flow chart that schematically illustrates a method for non-blocking committing of data to non-volatile memory, in accordance with an embodiment of the present invention.

FIG. 2 is a flow chart that schematically illustrates a method for non-blocking committing of data, in accordance with an embodiment of the present invention. The left-hand-side of the figure shows the operation of SSD 28. At a data reception step 60, SSD controller 48 receives data for storage from computer 24 via interface 36.

At a buffering step 64, SSD controller 48 buffers the received data temporarily in DRAM 52, and subsequently transfers the buffered data from DRAM 52 to Flash devices 44. In particular, SSD controller 48 ensures that only the most-recently received X KB of data may be non-committed. In other words, at any point in time, any data that arrived in the SSD "more than X KB ago" is already committed to Flash devices 44.

The right-hand-side of FIG. 2 shows the operation of computer 24. At a data sending step 68, computer 24 sends data to SSD 28 for storage via interface 36. At a flush checking step 72, computer 24 checks whether flushing is needed. If not, the method loops back to step 68 above.

If flushing is needed, computer 24 may send at least another X KB of data to SSD 28 (or wait until at least another X KB of data have been sent), at an additional sending step 76. At this point, computer 24 can safely assume that the previous data (any data sent before the most recent X KB) is already committed to Flash devices 44. Alternatively if the computer does not have additional data to store, it may issue a conventional flush command.

As can be appreciated, the "virtual flush" operation of FIG. 2 is non-blocking and integrates seamlessly into the normal data flow between computer 24 and SSD 28.

In an example embodiment, the predefined amount of data X is derived from the data size of a maximal group of memory pages in Flash devices 44 that may corrupt one another in case of a sudden power interruption. Consider, for example, a Multi-Level Cell (MLC) or Triple-Level Cell (TLC) Flash memory that comprises multiple word lines, each word line storing N memory pages. If a power interruption occurs while writing a memory page in a certain word line, other memory pages in the same word line may also become corrupted, even though they may have been written a long time ago.

Thus, in some embodiments, the SSD controller may define the group of pages in a word line as a basic data unit that is committed en-bloc. The predefined amount of data X may be set to the data size of such a group of pages. In some Flash devices such a group may comprise up to eighteen memory pages.

Generally, the predefined amount of data can be set to any suitable data size, e.g., between 64 KB and 32 MB. A smaller predefined amount of data, e.g., 64 KB, can be used, for example, in a mobile phone application. A larger predefined amount of data, e.g., 32 MB, can be used, for example, in an enterprise SSD application.

In some embodiments, system 20 implements the "virtual flush" operation jointly over the entire SSD 28. In this implementation, a single predefined amount of data X is defined and managed for the entire SSD.

In alternative embodiments, system 20 implements the "virtual flush" operation independently for different portions of the data, or for different portions of the non-volatile memory. In these embodiments, SSD controller 48 guarantees that only the X KB most-recently received data associated with a given portion (of the data or of the non-volatile memory) may be non-committed at any point in time. In order to ensure committing of given data belonging to the given portion (of the data or of the non-volatile memory), computer 24 sends at least another X KB of subsequent data belonging to the given portion (of the data or of the non-volatile memory). Different portions (of the data or of the non-volatile memory) may be specified different values of X.

For example, computer 24 may define multiple different streams in SSD 28, and carry out "virtual flush" independently per stream. In the present context, the term "stream" refers to a portion of the SSD that is written to a separate group of memory blocks and undergoes "garbage collection" (block compaction) independently.

The partitioning into streams can be used, for example, to ensure that data belonging to a given file or object is stored and managed together, and separately from other data. Such data is sometimes organized in groups of Logical Block Addresses (LBAs) that are referred to as localities or threads. The partitioning into streams can also be used, for example, for storing and managing frequently-accessed ("hot") data separately from rarely-accessed ("cold") data.

In an alternative embodiment, SSD 28 is divided into multiple channels, and system 20 carries out "virtual flush" independently per channel. In the present context, the term "channel" refers to a subset of Flash devices 44 that is connected to SSD controller 48 by a separate internal bus.

Flush Command Non-Blocking for Readout

In some embodiments, SSD 24 supports a flush command that is blocking for write commands but non-blocking for read commands. In these embodiments, from the time the flush command is issued by computer 24, and until all the buffered data is committed to Flash devices 44, the SSD is able to receive and execute read commands. Computer 24 is thus able to issue and execute read commands after issuing the flush command and before the flush command is acknowledged by the SSD.

Figure 3:
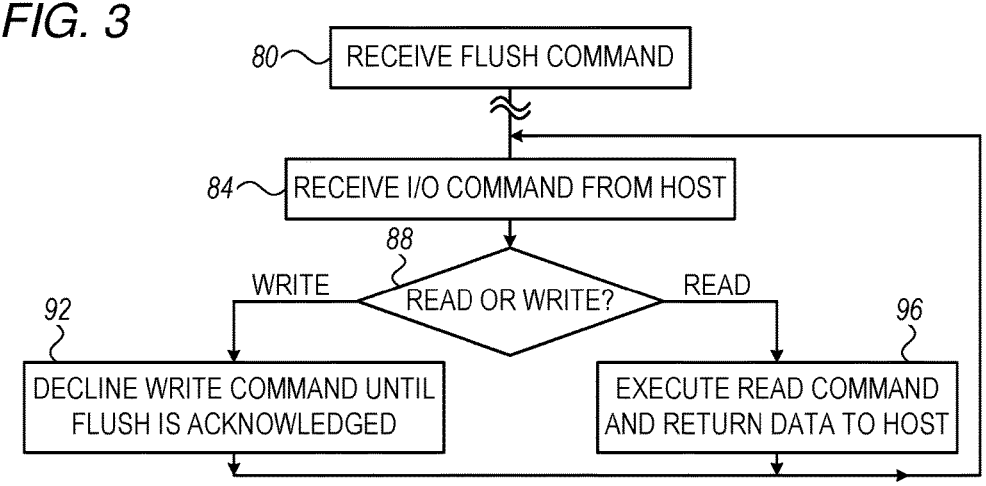
FIG. 3 is a flow chart that schematically illustrates a method for implementing a non-blocking flush command, in accordance with an embodiment of the present invention.

FIG. 3 is a flow chart that schematically illustrates a method for implementing a non-blocking flush command, in accordance with an embodiment of the present invention. The method begins with SSD controller 48 of SSD 28 receiving a flush command from computer 24, at a flush receiving step 80.

At a storage command reception step 84, SSD controller 48 receives a storage command (also referred to as I/O command) from computer 24. At a checking step 88, the SSD controller checks whether the command is a write command or a read command.

If the command is a write command, the SSD controller declines the command until the flush operation is completed and acknowledged, at a declining step 92. If the command is a read command, the SSD controller executes the command and returns the retrieved data to computer 24, at a read execution step 96. The process of steps 88-96 typically continues until the flush operation is completed and acknowledged.

In many practical applications, the Quality-of-Service (QoS) of an SSD is determined by the SSD access latency, and in particular the distribution of read latency. Therefore, enabling readout of data from the SSD during flush increases the SSD QoS significantly.

Although the embodiments described herein mainly address data storage in general, the methods and systems described herein can also be used in other applications, such as in data backup or in creation of data snapshots or clones.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A computing system, comprising:
   a storage device, which comprises a volatile memory and a non-volatile memory, and which is configured to receive data for storage in the non-volatile memory, to buffer at least some of the received data temporarily in the volatile memory, and to guarantee that any data, which is not part of a predefined amount of data that was most recently received, has been committed to the non-volatile memory; and
   a host, which is configured to send the data for storage in the storage device, and, in response to a need to commit given data to the non-volatile memory, to send the given data to the storage device followed by at least the predefined amount of additional data.

2. The computing system according to claim 1, wherein the host is configured to send the given data without an explicit command that instructs the storage device to transfer the given data to the non-volatile memory.

3. The computing system according to claim 1, wherein the storage device is configured to notify the host of a size of the predefined amount of data.

4. The computing system according to claim 1, wherein a storage space in the storage device, or the data to be stored in the storage device, is divided into two or more portions, and wherein the storage device is configured to guarantee committing of the data independently for each of the two or more portions.

5. The computing system according to claim 4, wherein the host is configured to commit a data item associated with the first portion, by sending the data item to the storage device followed by at least the predefined amount of additional data associated with the first portion.

6. The computing system according to claim 4, wherein the first and second portions correspond to first and second respective subsets of non-volatile memory devices in the storage device, or with first and second respective streams defined in the storage device.

7. A method for data storage, comprising:
   in a storage device that comprises a volatile memory and a non-volatile memory, receiving data for storage in the non-volatile memory, buffering at least some of the received data temporarily in the volatile memory, and guaranteeing that any data, which is not part of a predefined amount of data that was most recently received, has been committed to the non-volatile memory; and
   in a host, sending the data for storage in the storage device, and, in response to a need to commit given data to the non-volatile memory, sending the given data to the storage device followed by at least the predefined amount of additional data.

8. The method according to claim 7, wherein sending the given data is performed without an explicit command that instructs the storage device to transfer the given data to the non-volatile memory.

9. The method according to claim 7, and comprising notifying the host, by the storage device, of a size of the predefined amount of data.

10. The method according to claim 7, wherein a storage space in the storage device, or the data to be stored in the storage device, is divided into two or more portions, and wherein guaranteeing committing of the data is performed independently for each of the two or more portions.

11. The method according to claim 10, and comprising committing a data item associated with the first portion, by sending the data item from the host to the storage device followed by at least the predefined amount of additional data associated with the first portion.

12. The method according to claim 10, wherein the first and second portions correspond to first and second respective subsets of non-volatile memory devices in the storage device, or with first and second respective streams defined in the storage device.

13. A storage device, comprising:
    a volatile memory;
    a non-volatile memory; and
    a controller, which is configured to receive data for storage in the non-volatile memory, to buffer at least some of the received data temporarily in the volatile memory, to receive a flush command that instructs the storage device to commit the buffered data to the non-volatile memory, and, after receiving the flush command and before the buffered data has been completely committed in response to the flush command, to receive and execute one or more read commands that request readout of some of the data.

14. A method for data storage, comprising:
    in a storage device that comprises a volatile memory and a non-volatile memory, receiving data for storage in the non-volatile memory, and buffering at least some of the received data temporarily in the volatile memory;
    receiving in the storage device a flush command, which instructs the storage device to commit the buffered data to the non-volatile memory; and
    after receiving the flush command and before the buffered data has been completely committed in response to the flush command, receiving and executing in the storage device one or more read commands that request readout of some of the data.

* * * * *